US005166702A

United States Patent [19]

Mattern et al.

[11] Patent Number: 5,166,702

[45] Date of Patent: Nov. 24, 1992

[54] LED PRINTHEAD WITH IMPROVED CURRENT MIRROR DRIVER AND DRIVER CHIP THEREFOR

[75] Inventors: Michael W. Mattern, Hamlin; Jeremy K. Chung, Greece; Kenneth D. Kieffer, Rochester, all of N.Y.

[73] Assignee: Eastman Kodak Company, Rochester, N.Y.

[21] Appl. No.: 785,904

[22] Filed: Nov. 4, 1991

Related U.S. Application Data

[63] Continuation of Ser. No. 543,507, Jun. 26, 1990, abandoned.

[51] Int. Cl.$^5$ ........................ G01D 15/14; G01F 3/20

[52] U.S. Cl. ................................ 346/107 R; 323/315

[56] References Cited

U.S. PATENT DOCUMENTS

| | | | |
|---|---|---|---|
| 4,370,666 | 1/1983 | Neda et al. | 346/76 PH |
| 4,583,037 | 4/1986 | Sooch | 323/315 |
| 4,594,717 | 6/1986 | Bracht et al. | 372/38 |
| 4,746,941 | 5/1988 | Pham et al. | 346/154 X |
| 4,750,010 | 6/1988 | Ayers et al. . | |
| 4,831,395 | 5/1989 | Pham et al. | 346/160 |
| 4,864,216 | 9/1989 | Kalata et al. | 323/315 |
| 4,885,597 | 12/1989 | Tschang et al. . | |
| 4,952,949 | 8/1990 | Uebbing | 346/154 |

OTHER PUBLICATIONS

Patent Abstracts of Jap., vol. 4, No. 139 (M-34) (621) 30 Sep. 80 (JP A, 55 095 584, Minowa 19 Jul. 1980.

Patent Abstracts of Jap., vol. 13, No. 299, (M-847) (3647) 11 Jul. 89 (JP A, 1090 744(Hisane) 7 Apr. 89.

*Primary Examiner*—Benjamin R. Fuller
*Assistant Examiner*—David Yockey
*Attorney, Agent, or Firm*—Norman Rushefsky

[57] ABSTRACT

A non-impact printhead for use in recording on a recording medium includes a plurality of energizable recording elements such as LED's. Integrated circuit driver chips are provided that include a current mirror having a master circuit for generating a reference current and a plurality of slave circuits for providing respective driver currents to the recording elements selected for energization. A transistor switch is in series with a respective recording element and switchable from one state to another in response to a signal at its control electrode. An enabling circuit operating upon the control electrode switches the transistor switch to allow current to be selectively provided to the recording element for a predetermined period of time. Each of the slave circuits include an additional slave circuit which provides a current path for facilitating changing of the signal at the control electrode from on voltage level to another such as by allowing a capacitive charge at the control electrode to dissipate. A reference voltage is generated for driving the recording elements. A second transistor in series with the transistor switch establishes a first voltage signal that is input to one electrode of the transistor switch. The first voltage signal varies with variations in the reference voltage. The additional slave circuit generates a voltage signal at the control electrode of the transistor switch means that varies with the reference voltage. Thus, variations in the reference voltage will not substantially affect the level of current driven to the LED's during recording of a pixel.

4 Claims, 1 Drawing Sheet

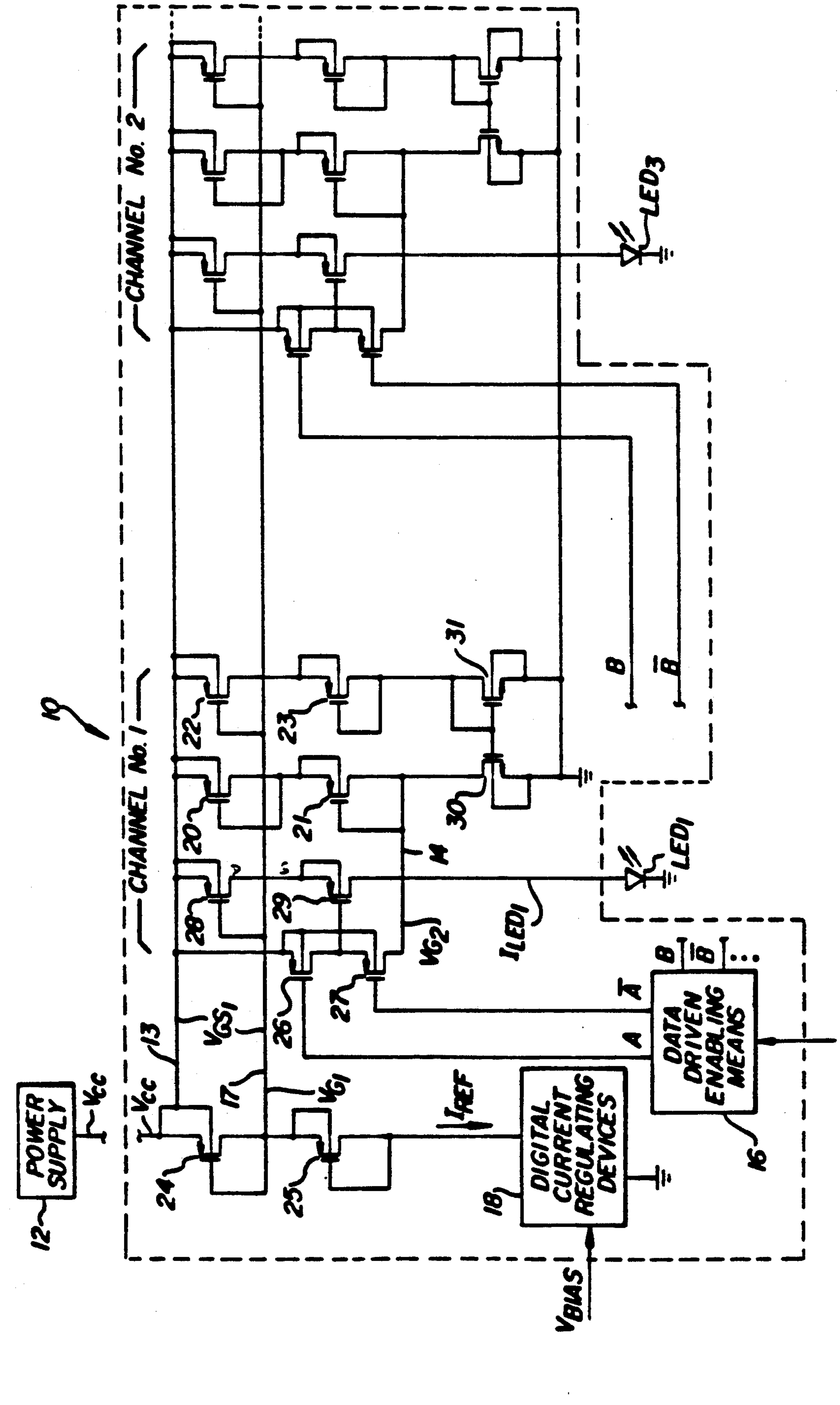
CHANNEL No. 2
LED3
CHANNEL No. 1
LED1
ILED1
B
B̄
A
Ā
VG2
VGS1
VG1
Vcc
IREF
POWER SUPPLY
DIGITAL CURRENT REGULATING DEVICES
DATA DRIVEN ENABLING MEANS
VBIAS
10
12
13
14
16
17
18
20
21
22
23
24
25
26
27
28
29
30
31

LED PRINTHEAD WITH IMPROVED CURRENT MIRROR DRIVER AND DRIVER CHIP THEREFOR

This is a continuation of application Ser. No. 07/543,507, filed Jun. 26, 1990 now abandoned.

CROSS REFERENCE TO RELATED APPLICATIONS

This application is related to the following applications filed on even date herewith:

1. U.S. application Ser. No. 07/543,892, filed in the names of Hadley et al and entitled, "Non-Impact Printer Apparatus With Improved Current Mirror Driver;"
2. U.S. application Ser. No. 07/543,931, filed in the names of Yee S. N. and entitled, "Non-Impact Printer for Recording in Color;"
3. U.S. application Ser. No. 07/543,891, filed in the name of Jeffrey Small and entitled, "L.E.D. Printer Apparatus with Improved Temperature Compensation;"
4. U.S. application Ser. No. 07/543,930, filed in the name of Jeffrey A. Small and entitled, "Non-Impact Printer with Token Bit Control of Data and Current Regulation Signals;" and
5. U.S. application Ser. No. 07/543,929, filed in the name of Martin Potucek et al and entitled, "L.E.D. Array Printer with Extra Driver Channel."

1. Field of the Invention

The present invention relates to non-impact print apparatus for recording on a moving photoreceptor or the like and an improved printhead and driver chip for use therewith.

2. Brief Description of the Prior Art

In the prior art, as exemplified by U.S. Pat. No. 4,885,597, the contents of which are incorporated herein by this reference, a printer apparatus is described which comprises a printhead having a multiplicity of individually addressable and energizable point-like radiation sources, such as LED's arranged in a row for exposing points upon a photoreceptor during movement of the latter relative to and in a direction normal to the row. Driver circuits are mounted on the printhead for simultaneously energizing the radiation sources responsive to respective data bit input signals applied to the driver circuits during an information line period. The printhead or recording head includes a support upon which are mounted chips placed end to end and upon each of which are formed a group of LED's. The driver circuits are formed as integrated circuits and are incorporated in chips that are located to each side of the linear array of LED chips. The driver circuits in this apparatus each include a shift register for serially reading-in data-bit signals and for driving respective LED's in accordance with the data signals.

Associated with each driver chip is a current-level controller that controls the level of current into the LED's of that group during recording. The controller comprises a current mirror having a master control circuit whose current is mirrored in slave circuits to which the LED's are connected. Thus, the level of current in the master circuit will be duplicated in the slave circuits or otherwise followed by some proportional amount. One advantage of this prior art printer apparatus is that current to the LED's may be changed automatically as needed, due to changes in aging or temperature of the printhead. As such changes affect the light output of the LED's, the changes to the current compensate for same so that some uniformity is provided to the recording apparatus.

In the driver circuit of the printhead, a problem arises in maintaining consistency of LED light output such as might occur due to variations in $V_{LED}$, the LED driving voltage. As $V_{LED}$ changes at the source electrode due, say, to variations in the load carried by the power supply producing $V_{LED}$, the light output of the LED's will be correspondingly affected, thereby affecting the quality of the exposure. In addition, in a grey scale printhead or a printhead where, in recording a line of pixels in the main-scan direction, i.e., the direction of the row of LED's, LED's may be turned on and off at different times for recording their respective pixels, see as background U.S. Pat. No. 4,750,010. As LED's are turned on, the MOSFET transistors controlling current to the LED's have a gate to substrate capacitive charge which must be dissipated before the transistor will turn on. Where many LED's are to be turned on at the same time the rise time, i.e., time for the LED to achieve full brightness, becomes dependent upon the number of LED's turned on simultaneously.

It is, therefore, an object of the invention to improve upon the printer apparatus of the prior art to overcome the above-noted problems.

SUMMARY OF THE INVENTION

In accordance with one aspect of the invention, there is provided a non-impact printhead for use in recording on a recording medium, the printhead comprising a plurality of energizable recording elements; driving means or energizing said recording elements, the driving means including current mirror means having a master circuit means for generating a reference current and a plurality of slave circuit means for providing respective driver currents to the recording elements selected for energization. A transistor switching means is provided in series with a respective recording element and switchable from one state to another in response to a signal. The transistor switching means has a control electrode for controlling current to he respective recording element in response to the signal. Enabling means operates upon the control electrode for switching the switching means to allow current to be selectively provided to respective recording elements for predetermined periods of time. Each of the slave circuit means includes an additional slave circuit means for providing a current path for facilitating changing of the signal at the control electrode from one voltage level to another.

In accordance with another aspect of the invention, there is provided a non-impact printhead for use in recording on a recording medium, the printhead comprising a plurality of energizable recording elements; driving means for energizing said recording elements. The driving means includes current mirror means having a master circuit means for generating a reference current and a plurality of slave circuit means for providing respective driver currents to the recording elements selected for energization. Transistor switching means is provided in series with a respective recording element and switchable from one state to another in response to a signal and has a control electrode for controlling current to its respective recording element in response to the signal. Enabling means operates upon the control terminal for switching the switching means o allow a level of current to be selectively provided to respective recording elements for predetermined periods of time. Means is provided for establishing a reference voltage for driving the recording elements. A second transistor means in series with said transistor switching means generates a first voltage signal that is input to one electrode of said transistor switching means. The first voltage signal varies with variations in the reference voltage. Each of the slave circuit means includes an additional slave circuit means for generating a second voltage signal at a second electrode of the transistor switching means that varies with the reference voltage.

In accordance with still another aspect of the invention, there is provided a driver chip for use on a non-impact printhead for driving a plurality of energizable recording elements; the driver chip comprising current mirror means having a master circuit means for generating a reference current and a plurality of slave circuit means for providing respective driver currents to the recording elements. A transistor switching means is switchable from one state to another in response to a signal and has a control electrode for controlling current to its respective recording element in response to the signal. Enabling means operates upon the control electrode for switching the switching means to allow current to be selectively provided to respective recording elements for predetermined periods of time. Each of the slave circuit means includes an additional slave circuit means for providing a current path for facilitating changing of the signal at the control electrode from one voltage level to another. Electrode means is provided to establish a reference voltage for driving the recording elements; a second transistor means in series with said transistor switching means generates a first voltage signal that is input to one electrode of said transistor switching means. The first voltage signal varies with variations in the reference voltage. The additional slave circuit means generates a second voltage signal at a second electrode of the transistor switching means that varies with the reference voltage.

In accordance with still another aspect of the invention, a driver chip for use on a non-impact printhead for driving a plurality of energizable recording elements is provided. The driver chip includes a current mirror means having a master circuit means for generating a reference current and a plurality of slave circuit means for providing respective driver currents to the recording elements selected for energization. A transistor switching means is switchable from one state to another in response to a signal and includes a control electrode for controlling current to its respective recording element in response to the signal. Enabling means operates upon the control electrode for switching the switching means to allow current to be selectively provided to respective recording elements for predetermined periods of time. Each of the slave circuit means includes an additional slave circuit means for providing a current path for facilitating changing of the signal at the control electrode from one voltage level to another.

BRIEF DESCRIPTION OF THE DRAWING

The accompanying figure illustrates a schematic of a circuit which forms part of a circuit in a driver chip for driving LED's.

DESCRIPTION OF THE PREFERRED EMBODIMENT

Because LED printheads are well known, description will be provided of the portion of a driver chip 10 for furnishing driving current to the LED's. Additional background information is provided in aforementioned U.S. Pat. No. 4,885,597, the contents of which are incorporated by reference. With reference now to the accompanying figure, a current mirror driving circuit is illustrated that includes a master circuit formed by transistors 24, 25 and a series of digitally controlled transistors generally designated 18. More details concerning the digitally controlled transistors may be found in the above-referenced patent as well as the cross-referenced applications referred to above. Briefly, these digitally controlled transistors may be selectively turned on to regulate a desired current level for the LED's driven by this driver chip. As may be noted in the figure, circuitry for driving two LED's, i.e., $LED_1$ and $LED_3$ are illustrated; it being understood that the driver chip would have appropriate circuits typified by those described below and forming drive channel #1 for driving say 64 of the odd-numbered LED's in an LED chip array having, for example, 128 LED's. Another driver chip on the other side of the LED chip array would be used to drive the 64 even-numbered LED's.

The current, $I_{REF}$, through the master circuit establishes a potential difference $V_{GS1}$ between lines 13 and 17. Directly in series with $LED_1$ are two transistors 28, 29. Transistor 28 is biased to be always conductive while transistor 29 is switched on and off and thus is the transistor controlling whether or not current is driven to $LED_1$. The gate or control electrode of transistor 29 is coupled to the drain-source connection of switching transistors 26, 27. When LED is to be turned on, transistor 27 is made conductive and transistor 26 is turned off and when LED is to be turned off, transistor 26 is made conductive and transistor 27 is turned off. The gate of transistor 26 receives a logic signal that is the inverse of that to gate 27 from a data driven enabling means 16 which controls, via lines A, $\overline{A}$; B, $\overline{B}$; etc., whether or not an LED is to be turned on and for how long. In a grey level printhead, LED's are turned on for respective durations determined by the grey level data signals input to the printhead. In this regard, see aforementioned U.S. Pat. No. 4,750,010 and U.S. application Ser. No. 07/290,002.

Also associated with the current mirror circuitry for driving $LED_1$, is an additional current mirror that includes two slave circuits. One slave circuit comprises transistors 20, 21 and 30. The other slave circuit comprises transistors 22, 23 and 31. Transistors 30, 31 are N-channel MOSFETS while the other transistors noted above are P-channel MOSFETS. The two additional slave circuits associated with $LED_1$ are on continuously and assuming a nominal driving current of say I=4 ma to $LED_1$, the current through transistor 21 might be $1/80\times I$ and the current through transistor 23 might be $1/800\times I$. The currents through these slave circuits establishes a voltage level $V_{G2}$ on line 14, to which the drain electrode of transistor 27 is connected.

In operation with transistor 29 turned off, transistor 26 is on and impresses approximately the voltage $V_{cc}$ at the gate of transistor 29. When $LED_1$ is to be turned on to record a pixel (picture element), a signal is provided by he enabling means 16 to the gate of transistor 27 to turn same on, while an inverse signal turns transistor 26 off. Before transistor 29 turns on, the capacitive load existing between its gate and substrate must be removed. When transistor 27 turns on the charge on the gate terminal of transistor 29 discharges through transistors 27 and 30. This path for discharge of the gate capacitive load at transistor 29 thereby provides a turn-on time not affected by the number of LED's that are sought to be simultaneously energized. The reason for this is that each control transistor corresponding to transistor 29 has its own respective path for discharge of its respective capacitive load. While the illustrated embodiment shows use of the additional current mirror circuit containing transistor 30 for use in discharging the control electrode, it will be understood that in some embodiments, charging of the control electrode may be used to enhance turn-on time.

Description will now be provided relative to the feature of stability of driver current, $I_{LED1}$, through transistor 29 and thus $LED_1$, even though there are small variations in $V_{cc}$ due to say heavy loading on the power supply generating same. As noted above, current through transistors 22, 23 and 31 is proportional to, i.e. mirrors, that through the master circuit because of the identical gate to source terminal biasing ($V_{GS1}$) of transistors 24 and 22. Thus, current is constant in this slave circuit even though $V_{cc}$ varies since the potential difference $V_{GS1}$ between the gate and source terminal of transistor 22 remains constant. The current through the slave circuit comprised of transistors 22, 23 and 31 is mirrored by that through he slave circuit comprised of transistors 20, 21 and 30 due to the identical gate to source biasing of transistors 30 and 31. With a constant current being generated in the slave circuit comprised of transistors 20, 21 and 30, the potential difference between the gate and source terminals of transistor 20 remains fixed as does that of transistor 21 thereby establishing a voltage level $V_{G2}$ on line 14 which varies with $V_{cc}$ although the potential difference $V_{22}-V_{G2}$ remains constant. With the transistor 29 turned on and conducting driving current to $LED_1$ during an exposure period, the voltage level $V_{G2}$ is established at the gate of transistor 29 via now conducting transistor 27. The voltage level at the source terminal of transistor 29 is now at a fixed threshold value above that of $V_{G2}$. Transistor 29, acting as a cascade transistor and having its source terminal connected to the drain terminal of transistor 28, thereby establishes the drain potential of the transistor 28 as varying with changes in $V_{cc}$. As noted above, the potential difference $V_{GS1}$ is constant even though $V_{cc}$ itself varies. The voltage relationships between the various terminals of transistor 28 are not affected by variations in $V_{cc}$ and the current to $LED_1$ during a period for recording a pixel stays constant.

Thus, stability in driver current to LED is provided since transient changes in $V_{cc}$ do not cause corresponding changes to the current conducted through $LED_1$ and thus do not affect the intensity level of light output by $LED_1$. The tendency in some LED printheads for light output of an LED to diminish when other LED's are turned on can also be reduced with the circuit of the invention. It will also be noted that line 17 bearing voltage $V_{G1}$ is further stabilized by having same be constant relative to $V_{cc}$ and not subject to being switched. The stabilizing of the current to each LED by this circuit allows the length of the transistors to be reduced substantially. Previously, to minimize the effects of current changes due to changes in $V_{cc}$, larger sized transistors were required. Thus, there has been described an LED printhead having an improved driving circuit for generating driving current to the recording elements that provides for turn-on times that are relatively independent of the number of recording elements turned on and further provides for constancy in light output by making the driving current insulated from changes in the driver voltage. Modifications to the circuit may, of course, be made. For example, transistors 25 and 23 are used effectively as resistors and may be also eliminated.

While the preferred embodiment has been described in terms of integrated circuit chips providing MOS transistors that have their respective gates controlled, other devices providing an equivalent function such as bipolar or other gate controlled devices are also contemplated. Where bipolar transistors are used, emitter-collector-geometry or doping levels to respective transistors may be modified to provide the current scaling characteristics described herein.

The invention has been described in detail with particular reference to preferred embodiments thereof, but it will be understood that variations and modifications can be effected within the spirit and scope of the invention.

What is claimed is:

1. A non-impact printhead for use in recording on a recording medium, the printhead comprising:

a plurality of energizable recording elements;

driving means, including means for establishing a reference voltage, for energizing said recording elements, said driving means including a current mirror circuit having a master circuit means for generating a reference current and a plurality of first slave circuit means for providing respective driver currents to recording elements selected for energization;

each first slave circuit means including:

(a) transistor switching means in series with a respective recording element and switchable from one state to another in response to a signal, and having a control electrode, for controlling driver current to the respective recording element in response to the signal;

(b) means operating upon the control electrode for switching the switching means to allow driver current to be selectively provided to a respective recording; element for a predetermined period of time;

(c) second slave circuit means for providing a current path for facilitating changing of the signal at the control electrode from one voltage level to another; and (d) second transistor means in series with said transistor switching means for establishing a first voltage signal that is input to one electrode of said transistor switching means, said first voltage signal varying with variations in said reference voltage; said second slave circuit means operating to establish a second voltage signal at a control electrode of the transistor switching means that varies with the reference voltage.

2. The printhead of claim 1 and wherein the recording elements are light-emitting diodes.

3. A non-impact printhead for use in recording on a recording medium, the printhead comprising:

a plurality of energizable recording elements;

means for establishing a reference voltage for driving the recording elements;

driving means for energizing said recording elements; said driving means including a current mirror circuit having a master circuit means for generating a reference current and a plurality of first slave circuit means for providing respective slaved driver currents to recording elements selected for energization;

each first slave circuit means including:

(a) transistor switching means in series with a respective recording element and switchable from one state to another in response to a signal, and having a control electrode, for controlling driver current to the respective recording element in response to the signal;

(b) means operating upon the control electrode for switching the switching means to allow a level of driver current to b selectively provided to a respective recording element for a predetermined period of time;

(c) second transistor means in series with said transistor switching means for generating a first voltage signal that is input to one electrode of said transistor switching means, said first voltage signal varying with variations in said reference voltage; and (d) second slave circuit means for generating a second voltage signal at a control electrode of the transistor switching means that varies with the reference voltage.

4. A driver chip for use on a non-impact printhead for driving a plurality of energizable recording elements; said driver chip comprising:

electrode means for establishing a reference voltage for driving the recording elements;

a current mirror circuit including a master circuit means for generating a reference current and a plurality slaved driver currents to recording elements; each first slave circuit means including:

(a) transistor switching means switchable from one state to another in response to a signal, and having a control electrode, for controlling driver current to a recording element in response to the signal;

(b) means operating upon the control electrode for switching the switching means to allow driver current to be selectively provided to a respective recording element for a predetermined period of time;

(c) second slave circuit means for providing a current path for discharge of a capacitive load at the control electrode and;

(d) second transistor means in series with said transistor switching means for generating a first voltage signal that is input to one electrode of said transistor switching means, said first voltage signal varying with variations in said reference voltage; said second slave circuit means operating to generate a second voltage signal at said control electrode of the transistor switching means that varies with the reference voltage.

* * * * *

UNITED STATES PATENT AND TRADEMARK OFFICE

CERTIFICATE OF CORRECTION

PATENT NO. : 5,166,702

DATED : Nov. 24, 1992

INVENTOR(S) : Michael W. Mattern, et al

It is certified that error appears in the above-indentified patent and that said Letters Patent is hereby corrected as shown below:

Item [57] Abstract, line 17, "on" should read --one--

Column 1, line 18 "N." should read --Ng--.

Column 2, line 43 "he" should read --the--.

Column 2, line 68 "o" should read --to--.

Column 4, line 36 "LED" should read --$LED_1$--.

Column 4, line 38 "LED" should read --$LED_1$--.

Column 5, line 30 "he" should read --the--.

Column 5, line 38 "$V_{22}$" should read --$V_{CC}$--.

Column 5, line 54 "LED" should read --$LED_1$--.

Column 6, line 47 delete ";".

Column 7, line 19 "b" should read --be--.

UNITED STATES PATENT AND TRADEMARK OFFICE

CERTIFICATE OF CORRECTION

PATENT NO. : 5,166,702
DATED : Nov. 24, 1992
INVENTOR(S) : Michael W. Mattern, et al It is certified that error appears in the above-indentified patent and that said Letters Patent is hereby corrected as shown below:

Column 8, line 8 after "plurality" add --of first slave circuit means for providing respective--.

Signed and Sealed this

Twelfth Day of April, 1994

Attest:

BRUCE LEHMAN

Attesting Officer

*Commissioner of Patents and Trademarks*